United States Patent
Wang et al.

(10) Patent No.: US 9,816,028 B2
(45) Date of Patent: Nov. 14, 2017

(54) PROCESS FOR THE PREPARATION OF GADOLINIUM OXYSULFIDE ($GD_2O_2S$) SCINTILLATION CERAMICS

(71) Applicants: Tsinghua University, Beijing (CN); Nuctech Company Limited, Beijing (CN)

(72) Inventors: Yanchun Wang, Beijing (CN); Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Jianping Chang, Beijing (CN); Shuqing Zhao, Beijing (CN); Wenjian Zhang, Beijing (CN); Yongqiang Wang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 256 days.

(21) Appl. No.: 14/827,258

(22) Filed: Aug. 14, 2015

(65) Prior Publication Data

US 2016/0046861 A1  Feb. 18, 2016

(30) Foreign Application Priority Data

Aug. 14, 2014  (CN) .......................... 2014 1 0398953

(51) Int. Cl.
  *B32B 27/32*  (2006.01)
  *C04B 33/32*  (2006.01)
  (Continued)

(52) U.S. Cl.
  CPC ...... *C09K 11/7772* (2013.01); *C04B 35/5156* (2013.01); *C04B 35/547* (2013.01);
  (Continued)

(58) Field of Classification Search
  None
  See application file for complete search history.

(56) References Cited

U.S. PATENT DOCUMENTS

| 4,747,973 A | 5/1988 | Cusano et al. |
| 6,384,417 B1 | 5/2002 | Okumura et al. |
| (Continued) | | |

FOREIGN PATENT DOCUMENTS

| CN | 101253128 A | 8/2008 |
| CN | 101370749 A | 2/2009 |
| (Continued) | | |

OTHER PUBLICATIONS

"Effects of ball milling and post-annealing on the transparency of spark plasma sintered Lu2O3," Ceramics International, vol. 37, No. 7, 2011, pp. 2263-2267.*

(Continued)

*Primary Examiner* — David Sample
*Assistant Examiner* — Nicole T Gugliotta
(74) *Attorney, Agent, or Firm* — Knobbe, Martens, Olson & Bear, LLP (57) ABSTRACT

The present disclosure is directed to a rapid process for the preparation of gadolinium oxysulfide having a general formula of $Gd_2O_2S$, referred to as GOS, scintillation ceramics by using the combination of spark plasma primary sintering (SPS) and hot isostatic pressing secondary sintering.

24 Claims, 4 Drawing Sheets

(51) Int. Cl.
- *C04B 35/50* (2006.01)
- *C04B 35/645* (2006.01)
- *B28B 1/00* (2006.01)
- *B28B 5/00* (2006.01)
- *B28B 3/00* (2006.01)
- *C09K 11/77* (2006.01)
- *C04B 40/00* (2006.01)
- *C04B 35/515* (2006.01)
- *C04B 35/547* (2006.01)
- *C04B 35/626* (2006.01)
- *C04B 35/64* (2006.01)

(52) U.S. Cl.
CPC .......... *C04B 35/6261* (2013.01); *C04B 35/64* (2013.01); *C04B 35/645* (2013.01); *C04B 35/6455* (2013.01); *C04B 40/0007* (2013.01); *C04B 2235/3203* (2013.01); *C04B 2235/3224* (2013.01); *C04B 2235/3229* (2013.01); *C04B 2235/3287* (2013.01); *C04B 2235/445* (2013.01); *C04B 2235/5436* (2013.01); *C04B 2235/5481* (2013.01); *C04B 2235/6565* (2013.01); *C04B 2235/6567* (2013.01); *C04B 2235/6581* (2013.01); *C04B 2235/661* (2013.01); *C04B 2235/662* (2013.01); *C04B 2235/666* (2013.01); *C04B 2235/72* (2013.01); *C04B 2235/77* (2013.01); *C04B 2235/9653* (2013.01)

(56) References Cited

U.S. PATENT DOCUMENTS

| | | | |
|---|---|---|---|
| 7,531,109 | B2 | 5/2009 | Lacourse et al. |
| 8,025,817 | B2 | 9/2011 | Bolyasnikova et al. |
| 2007/0027025 | A1 | 2/2007 | LaCourse et al. |
| 2012/0118343 | A1* | 5/2012 | Iida .................. C04B 35/58085 136/200 |

FOREIGN PATENT DOCUMENTS

| | | |
|---|---|---|
| CN | 101993240 A | 3/2011 |
| JP | S62/275072 | 11/1987 |
| JP | S64/038491 | 2/1989 |
| JP | 2000/171563 | 6/2000 |
| JP | 2005/112658 | 4/2005 |
| JP | 2008/501611 | 1/2008 |
| JP | 2009/502716 | 1/2009 |
| JP | 2011/214026 | 10/2011 |
| WO | WO 2007/015862 | 2/2007 |
| WO | WO 2007/083248 A1 | 7/2007 |

OTHER PUBLICATIONS

First Office Action and search report dated Mar. 3, 2017, in Chinese Application No. 201410398953.8 (7 pgs); concise English-language summary thereof (2 pgs); 9 pages total.

Office Action received in German Application No. 102015215505.6 dated Dec. 1, 2016 (5 pgs), as well as English-language translation of same (2 pgs); 7 pages total.

Office Action dated Sep. 27, 2016, received in Japanese counterpart appln No. 2015/159731 (7 pgs), and English-language translation thereof (9 pgs); 16 pages total.

* cited by examiner

PROCESS FOR THE PREPARATION OF GADOLINIUM OXYSULFIDE ($GD_2O_2S$) SCINTILLATION CERAMICS

CROSS-REFERENCE TO RELATED APPLICATIONS

This application claims priority to Chinese Patent Application No. 201410398953.8, filed on Aug. 14, 2014, which is hereby incorporated by reference in its entirety.

FIELD

The present disclosure relates to a process for the preparation of materials, particularly to a process for the preparation of gadolinium oxysulfide (having the general formula of $Gd_2O_2S$, referred to as GOS) scintillation ceramics.

The present disclosure further relates to gadolinium oxysulfide scintillation ceramics as prepared according to the process of the invention, as well as a high-energy radiation detecting device comprising GOS scintillation ceramics.

BACKGROUND

Ion-doped rare earth oxysulfides having the general formula of $Re_2O_2S:Ln$ are known, in which Re is a rare earth element and Ln is a doping ion. The doping ion may also be selected from at least one element of Pr, Ce, Eu, Tb, Yb, Dy, Sm, Ho, Tm, Dy and Er. Ceramic scintillators have many advantages over traditional scintillation monocrystals such as CsI, $CdWO_4$ and the like, including high density, high light yield, stable chemical properties, simple preparation process, and no dissociation during processing. Accordingly, they would be scintillator materials with desired and excellent comprehensive performances for radiation inspection instruments or detectors such as X-ray CT, high-speed X-ray scanners, and security inspection equipments. The Pr and/or Ce ion-doped GOS scintillation ceramics have extremely low afterglow, thereby being an ideal scintillator for CT radiation detectors.

In general, the preparation processes of GOS scintillation ceramics include uniaxial hot pressing process and hot isostatic pressing process. The hot isostatic pressing process comprises the steps of directly charging scintillation powders in a metal vessel, and placing the metal vessel in a gas pressure furnace to conduct hot isostatic pressing sintering, which process is very difficult. The uniaxial hot pressing process requires scintillation powders having small particle size to obtain high surface activity, and generally it would be required that the powders have a surface activity of at least BET 10 $m^2/g$.

SUMMARY

The present invention provides a process for the preparation of GOS scintillation ceramics from commercially available $Gd_2O_2S$ scintillation powders. In the present invention, high density GOS scintillation ceramics are very efficiently prepared by a two-step sintering method using the combination of spark plasma sintering (SPS) and hot isostatic pressing (HIP).

Said two-step sintering method comprises the steps of preparing a primary sintered body having closed pores by using spark plasma sintering (SPS) process; and preparing a high density secondary sintered body by using hot isostatic pressing sintering process under the atmosphere of inert gas, followed by further treating the resulting secondary sintered body to achieve GOS scintillation ceramics.

In particular, in one aspect of the invention, provided is a process for the preparation of GOS scintillation ceramics, comprising the following steps:

1) adding to GOS scintillation powders a sintering-aid agent, and mixing them to be homogenous;
2) charging the homogenous mixture of the GOS scintillation ceramic powders with the sintering-aid agent into a sintering mould, and subjecting it to spark plasma primary sintering, thereby obtaining a GOS primary sintered body;
3) annealing the GOS primary sintered body;
4) subjecting the annealed GOS primary sintered body to secondary sintering using hot isostatic pressing, thereby obtaining a GOS secondary sintered body;
5) subjecting the GOS secondary sintered body to secondary annealing, to obtain GOS scintillation ceramics.

In another aspect of the invention, GOS scintillation ceramics obtained by the process according to the invention are provided.

In another aspect of the invention, a high-energy radiation detecting device comprising the GOS scintillation ceramics obtained by the process according to the invention is provided.

DESCRIPTION OF THE DRAWINGS

The invention will now be described in greater detail with reference to the accompanying drawings.

DETAILED DESCRIPTION

Figure 1:
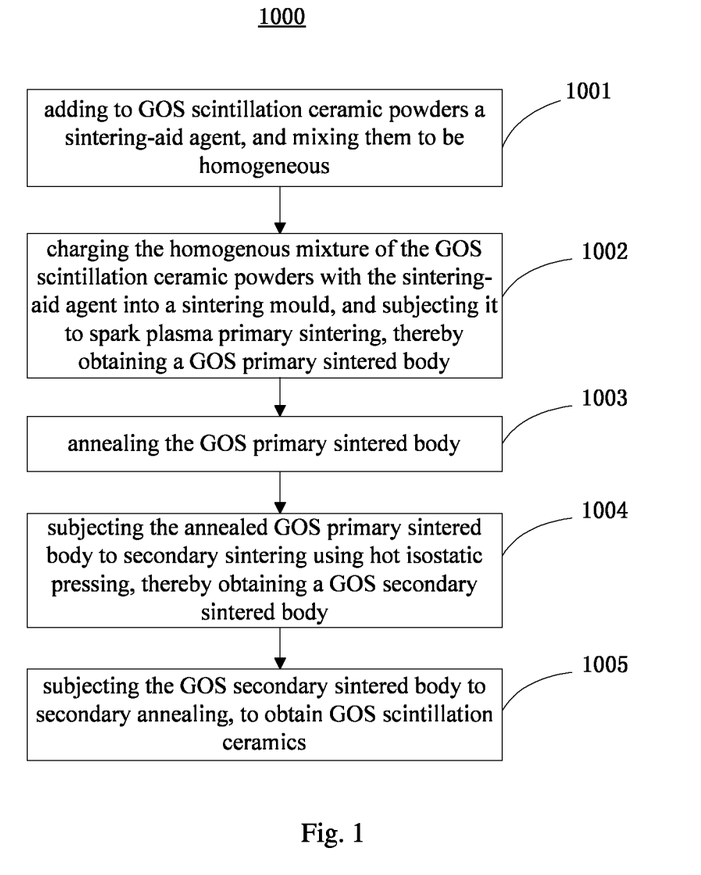
FIG. 1 is a flow chart of a process for the preparation of GOS scintillation ceramics according to an embodiment of the invention.

FIG. 1 shows a process for the preparation of GOS scintillation ceramics according to an embodiment of the invention. As illustrated in FIG. 1, the process 100 comprises the following steps of:

At step S1001, adding to GOS scintillation ceramic powders a sintering-aid agent, and mixing them to be homogeneous;

At step S1002, charging the homogenous mixture of the GOS scintillation ceramic powders with the sintering-aid agent into a sintering mould, and subjecting it to spark plasma sintering, thereby obtaining a GOS primary sintered body;

At step S1003, annealing the GOS primary sintered body;

At step S1004, subjecting the annealed GOS primary sintered body to secondary sintering using hot isostatic pressing, thereby obtaining a GOS secondary sintered body; and At step S1005, subjecting the GOS secondary sintered body to secondary annealing, thereby obtaining GOS scintillation ceramics.

The spark plasma sintering may be carried out at a relatively low temperature, to quickly prepare GOS scintillation ceramics from GOS scintillation ceramic powders with relatively large particle diameter, so that the prepared ceramics have the advantages of small crystal particles and compact structure. The combination with hot isostatic pressing secondary sintering will further remove and/or reduce pores inside the ceramics, improve density of ceramics, and increase light transmittance, thus increasing the light output of the final GOS scintillator.

Below, the process 1000 for the preparation of GOS scintillation ceramics according to the invention will be described in greater detail. The process 1000 comprises the following steps of:

1) adding a sintering-aid agent to $Gd_2O_2S$:Pr,Ce scintillation powders having a median diameter of 5-9 μm. Preferably, the powders are commercially available, in which Pr ion is doped in an amount of 500-800 ppm by weight and Ce ion is doped in an amount of 10-100 ppm by weight. Preferably, the sintering-aid agent is LiF and/or $Li_2GeF_6$, being added in an amount of 0.02-1%, preferably 0.1-1%, relative to the mass of the scintillation powders. The mixed powders are ball-milled so that they are mixed to be homogeneous, and optionally refined, thereby obtaining powders incorporated with the sintering-aid agent. Preferably, the ball-milling is performed using a planetary ball mill, more preferably in the presence of anhydrous alcohol and zirconia balls as milling medium. With above milling, $Gd_2O_2S$:Pr,Ce,F powders incorporated with the sintering-aid agent having a median diameter of 1-9 μm is obtained. It is preferred to obtain anyone of two types of powders comprising sintering-aid agent below. Powders having a median diameter of 4-9 μm (hereinafter abbreviated as the primary powders) may be obtained by ball-milling the mixed powders for a short time, such as for 0.5-3 h. Powders having a median diameter of 1-4 μm, preferably 2-3 μm (hereinafter abbreviated as the secondary powders) may be obtained by refining with ball-milling for a long time, such as 4-36 hours. A main function of ball-milling is to refine the powders. In order to obtain powders with a fine particle size, some technicians control the particle size during the chemical preparation stage of powders to obtain the fine powders. However this process is disadvantageous of low yield and high cost. In the present invention, ball-milling is carried out prior to sintering, providing a low cost and a high yield.

Preferably, following ball-milling, the slurry is filtrated using pump, placed in a vacuum drying oven to vacuum dry, then grinded and sieved, and preserved for standby and easy to use.

2) charging the ball-milled mixed powders into a sintering mould. The mould is placed in a heat furnace and pre-pressurized to 20-40 MPa, gradually charged to thousands of amperes (A), and then heated to 1000° C.-1100° C. The temperature is kept for 10-30 minutes. The powders are continuously heated up to 1200° C.-1500° C. and meanwhile pressurized to 60-200 MPa. Preferably, for the primary powders, the sintering is carried out at the temperature from 1350° C. to 1500° C., more preferably from 1400° C. to 1450° C., and at the pressure from 150 to 200 MPa, most preferably 200 MPa for 5-30 minutes. For the secondary powders, the sintering is carried out at the temperature preferably from 1200° C. to 1350° C., more preferably from 1250 to 1300° C., and at the pressure preferably from 50-150 MPa, more preferably 60 MPa for 5-30 minutes. After that, the powders are cooled at the rate of 10-100° C./min so that GOS ceramics are obtained. Preferably, the temperature is reduced quickly at the beginning of cooling stage such as at the cooling rate of up to 100° C./min, and then slowly such as at the rate of 10° C./min or more when it is reduced to about 600 degree.

3) air annealing the GOS sintered body at the temperature ranging from 1000° C. to 1200° C., preferably in a muffle furnace, yielding GOS ceramics.

In order to further increase the compactness of GOS ceramics, GOS ceramics are optionally subjected to secondary sintering with hot isostatic pressing process under an inert gas such as argon or nitrogen atmosphere at a temperature of from 1300° C. to 1500° C. under 150-250 MPa. However, the secondary sintering is not essential. When SPS sintering process is properly configured, the prepared ceramic body has already had a fairly high density and its light transmittance meets the requirements for high-energy radiation detecting device (such as X-ray detector). The GOS ceramics having a relatively low density after SPS sintering may be subjected to HIP secondary sintering, thereby efficiently increasing its density and meanwhile keeping ceramic crystal particles uniform. The secondary annealing is carried out at the temperature ranging from 1000° C. to 1200° C., and preferably in a muffle furnace. The resultant GOS ceramics are coarsely grinded, finely grinded, cut, and polished, yielding GOS scintillation ceramics.

According to the process of the invention with spark plasma sintering technology, moulding and sintering of powders are finished in one step. At a relatively low temperature (1400-1500° C.), GOS scintillation ceramics are prepared with relatively density of up to 99.9%. The sintering time is significantly shortened to only tens of minutes. The obtained polycrystal GOS ceramics are translucent. Optionally, the sintered body having insufficiently high relative density although being treated with spark plasma sintering is further subjected to secondary sintering using hot isostatic pressing, to be further compacted. This spark plasma sintering process does not need vacuum sealing process in conventional hot isostatic pressing sintering process in which GOS powders are encapsulated into a metal sheath, such that it is an easy process technically. In the present invention, the powders to be sintered are obtained by using commercial $Gd_2O_2S$:Pr,Ce powders with a relatively large particle size having a median diameter of 5-9 μm and adding LiF or $Li_2GeF_6$ as sintering-aid agent and mixing them by ball-milling and refining, which process does not need the preparation technology of powders having a high specific surface activity and a fine particle size in conventional vacuum hot pressing sintering process, and the hot pressing process with high pressure (200-250 MPa) as well as its mould. By the one-step or two-step spark plasma sintering sintering method according to the process of the invention, transparent GOS scintillation ceramics having excellent performances can be prepared from commercially available GOS powders by controlling the process parameters, such as the current, the temperature for park plasma sintering, the heating rate, time for keeping the temperature, pressure and the like, thereby reducing the technical difficulties and the cost of production, shortening the preparation period, as well as increasing the production efficiency. In addition, spark plasma sintering has lower temperature and shorter period relative to vacuum hot pressing sintering, thus it efficiently inhibits coarsening of crystal particles, thereby obtaining GOS ceramics having high light transmittance. The present preparation process is favorable to expand the application fields of GOS scintillation ceramics, for example from the conventional field of medical radiation imaging to large-scale applications in the field of radiation imaging for security inspection which requires a lower cost.

Several main steps according to the present invention will be described below in greater detail with reference to more accompanying drawings.

I. Treatments of GOS Powders

The commercial $Gd_2O_2S$:Pr,Ce scintillation powders having a median diameter of 5-9 µm and a purity of 99.999% are provided. LiF and/or $Li_2GeF_6$ sintering-aid agent(s) is/are added in an amount of 0.02-1%. The mixture is placed in a completely cleaned polyurethane milling jar. Polished high density yttria stabilized zirconia grinding balls are added, wherein the ratio for large, medium and small balls having the diameters of 10 mm, 6 mm, 3 mm, respectively, is 1:3:10 by mass. The mass ratio of the balls and powders is (3-10):1. During ball-milling, the powders are immersed in high purity anhydrous alcohol with MOS grade and/or at the protection atmosphere of an inert gas (preferably argon), so that the surfaces of GOS powders are not oxidized during the ball-milling. With above milling, powders comprising the sintering-aid agent having a median diameter of 1-9 µm are obtained. It is preferred to obtain anyone of two types of powders incorporated with the sintering-aid agent below. The Primary powders having a median diameter of 4-9 µm is obtained by ball-milling the mixed powders for a short time, such as for 0.5-3 h. The Secondary powders having a median diameter of 1-4 µm is obtained by refining with ball-milling for a long time, such as 4-36 hours.

II. Sintering of GOS Scintillation Ceramics

Figure 2:
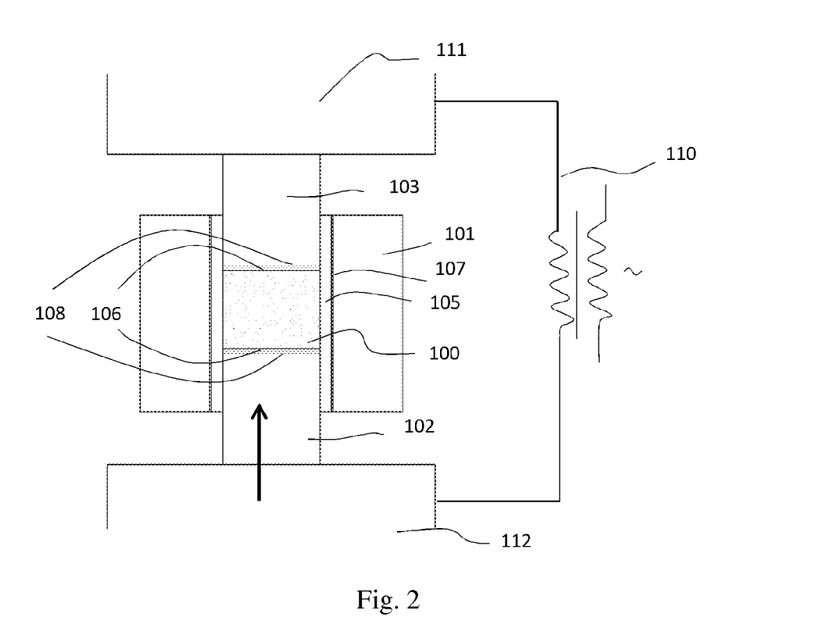
FIG. 2 is a schematic diagram of a device for spark plasma primary sintering according to an embodiment of the invention.

FIG. 2 is a schematic diagram of a device for spark plasma primary sintering according to an embodiment of the invention. As illustrated in FIG. 2, the mixed powders 100 comprising sintering-aid agent are filled in a sintering mould. In order to reduce the contamination to the scintillation ceramics caused by the diffusion of carbon in the mould, the mould is lined with BN ceramic cylinder 105. For ease of mould release, there is a graphite paper 107 between the BN ceramic cylinder and the mould cylinder 101. In the pressure axis direction, BN ceramic chip 106 is firstly placed on the side of contacting scintillation powders, then graphite paper 108 is laminated thereon, and then compression bars 102 and 103 of graphite or carbon fiber composite are set up outermost. The mould is placed in a heat furnace and pre-pressurized to 30 MPa, and gradually applied an electric current to at least thousands of amperes with power 110. The temperature is about 1000° C.-1100° C. and is kept for 10-30 minutes. The powders are continuously heated up to 1300° C.-1500° C., meanwhile applying axial pressure (40-200 MPa) via upper and lower press heads 111 and 112. The temperature is kept for 10-30 minutes. At the above conditions, the powders are subjected to spark plasma sintering. At the end of sintering, the pressure is released. The temperature is reduced at the rate of 10-100° C./min. After cooling, GOS sintered body is obtained. In order to achieve the above conditions, the sintering mould is selected from a mould made of high strength isostatic pressing graphite material, that is capable of withstanding the pressure of 60 MPa with low cost, and a mould made of carbon fiber composite, that is capable of withstanding the pressure of 200 MPa with high cost.

Figure 3:
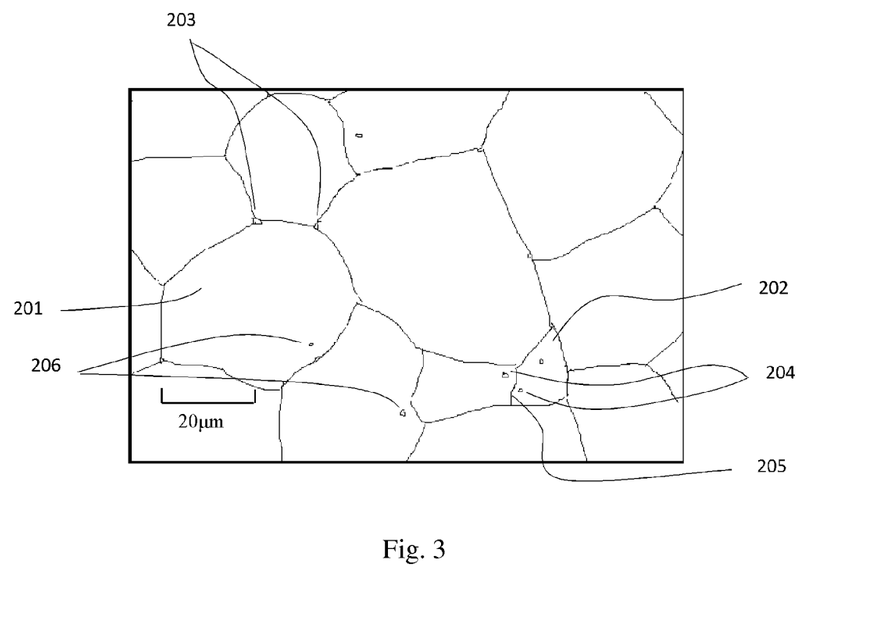
FIG. 3 is a schematic diagram of pores and crystal particles of the GOS spark plasma primary sintered body according to an embodiment of the invention.

The GOS sintered body obtained by spark plasma sintering has already had a relative density of about 98-99.9%, and there are few small pores inside the body. As illustrated in FIG. 3, pores 203 and 204 are mainly present at the confluence of several crystal particles/crystal boundaries or near the crystal boundary 205 between incomplete insufficiently sintered small crystal particles 202. There are also few pores 206 inside large crystal particle 201.

Figure 4:
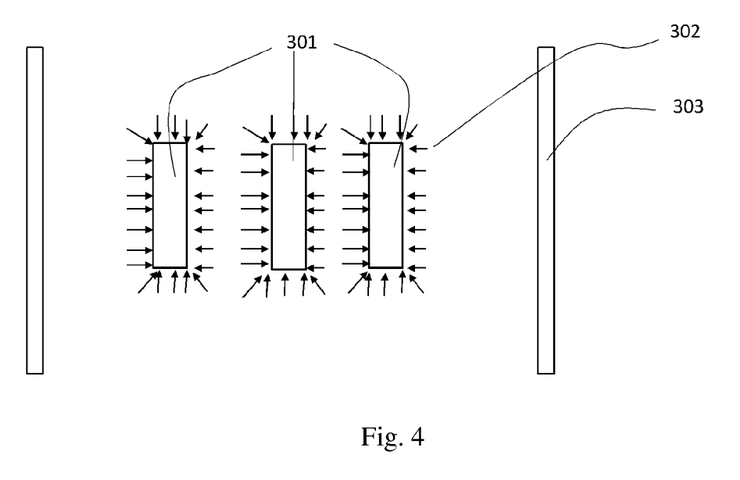
FIG. 4 is a schematic diagram of secondary sintering using hot isostatic pressing according to an embodiment of the invention.
Figure 5:
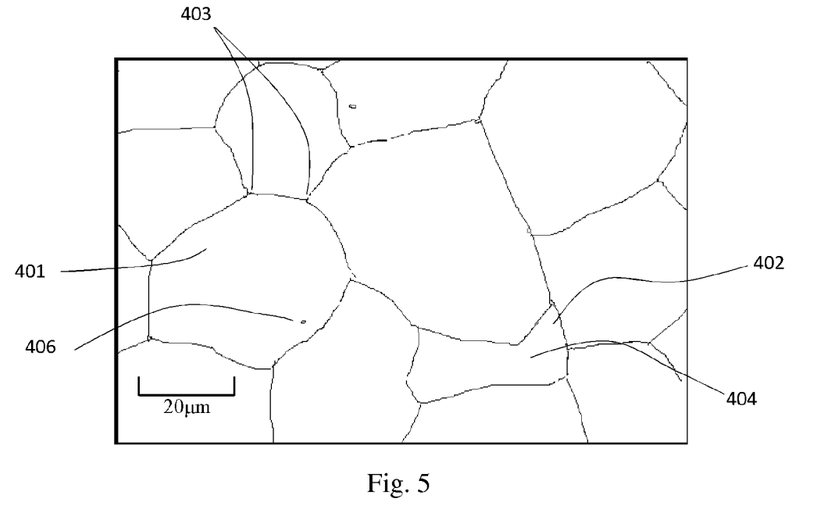
FIG. 5 is a schematic diagram of pores and crystal particles of the GOS hot isostatic pressing secondary sintered body according to an embodiment of the invention.

Following the above spark plasma sintering, the GOS sintered body is placed in a muffle furnace and subjected to air annealing at the temperature of 1000° C.-1200° C. The sintered body with a density of lower than 99.8% is directly placed in a hot isostatic pressing furnace for secondary sintering. As illustrated in FIG. 4, 301 is several primary sintered bodies obtained by the spark plasma sintering, 302 is a high pressure inert gas, generally argon or nitrogen, the pressure of which is uniformly applied on the outside surface of the GOS primary sintered bodies, and 303 is a heating unit. The sintering is carried out at 1300° C.-1500° C. in argon atmosphere under 200-350 MPa by keeping the temperature for 2-5 hours and subsequently reducing it gradually, thereby obtaining the final GOS ceramic sintered body. With the secondary sintering using hot isostatic pressing, pores inside the GOS ceramics are significantly decreased and the inner density of the GOS ceramics is further increased, as schematically shown in FIG. 5. As the crystal boundaries close, the pore 403 that is originally present at the confluence of particles gradually disappears or is reduced to from one-hundredth to one tenth of its original volume. As the crystal particle 402 grows, the pore 404 that is originally near crystal boundary also substantially disappears or significantly diminished, and the pore 406 inside the crystal particle 401 is compressed and significantly diminished. The disappearance or significant diminution would reduce the scattering of visible light and increase light transmittance of ceramics.

Figure 6:
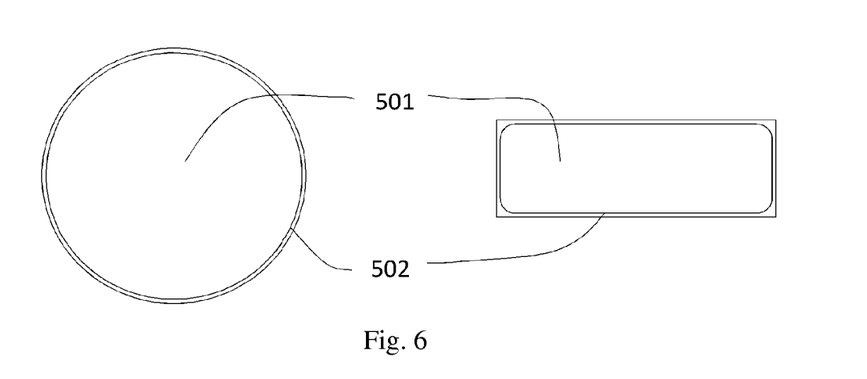
FIG. 6 is a schematic diagram of cross section of the GOS hot isostatic pressing secondary sintered body according to an embodiment of the invention.

The GOS ceramic sintered body subjecting secondary sintering with hot isostatic pressing is schematically shown in FIG. 6, on the surface of which an opaque layer 502 generally having a thickness of 0.1-1 mm is present. The thickness of the opaque layer would decrease with the increase of the density of primary sintered body. The formation of such opaque layer is caused by several small cracks resulting from the incompletely close of crystal boundaries in the primary sintered body. During the secondary sintering using isostatic pressing, cracks occur at the part of original incompletely closed crystal boundaries under high pressure of inert gas, such that the inert gas along cracks at the crystal boundary penetrates into ceramic body to form pores. Moreover, with the gradually permeation of the inert gas, its pressure is gradually reduced and cracks at the crystal boundary gradually disappear beyond the thickness of about 0.1-1 mm. At the inside of the GOS ceramics sintered body, there is GOS scintillation ceramic 501 having low porosity and high compactness. The opaque layer 502 on the surface is cut and grinded. The GOS scintillation ceramics 501 have a relative density of at least 99.8% and good visible light transmittance. The resultant GOS ceramic mass is cut, coarsely grinded, finely grinded, and polished, yielding GOS scintillation ceramics.

In order to efficiently increase the compactness of GOS ceramics during secondary sintering, it is necessary for the primary sintered body obtained by spark plasma sintering to have a relative theoretical density of 95.5% or more, preferably 97% or more and to have closed pores. In addition, in order to avoid the excessive growth of primary sintering crystal particles which goes against the compact growth of ceramic during secondary sintering, the temperature for primary sintering needs to be controlled and not too high. Meanwhile, relatively low temperature for spark plasma sintering benefits the reduction of contamination caused by the diffusion of carbon. In other words, under the conditions of given powder activity and pressure, it is required that the temperature for primary sintering could reach the lowest temperature required for the formation of closed pores, and is as low as possible. For the GOS powders having particle size of 1-9 μm, the temperature for spark plasma sintering is 1200-1500° C. under the pressure of 50-200 MPa. If the temperature is lower than 1200° C., then the sintering is insufficient and not all of pores are closed in sintered body so that the compactness cannot be increased by secondary sintering using hot isostatic pressing. If the temperature is higher than 1500° C., then excessive sintering occurs. Although the density could reach 99.9% at that temperature, it leads to serious contamination caused by the diffusion of carbon, bad light transmission, excessive growth of crystal particles, coarse crystal particles, very brittle ceramic body and be difficult to be subjected to the subsequent processing of scintillator array.

The invention will be further illustrated by specific examples hereinafter. It should be understood that these examples are included merely for purposes of illustration and the present invention is not limited thereto.

EXAMPLES

Examples 1-6

100 g of commercial $Gd_2O_2S$:Pr,Ce scintillator powder having a purity of 99.999% and a particle size distribution of d(0.1) of 4.0 μm, d(0.5) of 6.8 μm, and d(0.9) of 11.8 μm was weighted. To the powder, 0.2 g of $Li_2GeF_6$ sintering-aid agent was added. A polyurethane milling jar having an inner diameter of 100 mm and a height of 100 mm was charged with above formed mixture and 500 g of high density yttria stabilized zirconia grinding balls with a given size distribution under the atmosphere of argon tank. The milling jar was placed in a planetary ball mill. Ball-milling was carried out at the rate of 500 rpm for 3 hour, with the interval between forward and reverse of 0.5 h.

The polyurethane milling jar and zirconia grinding balls needed to be pre-washed. The method for pre-washing was as follows: 500 g of high density yttria stabilized zirconia grinding balls were placed in milling jar, in which 35 g of the balls has a diameter of 10 mm, 105 g of the balls has a diameter of 6 mm, 360 g of the balls has a diameter of 3 mm. To the milling jar, 50 g of GOS powder and 500 mL of anhydrious alcohol were added. The ball-milling was carried out in planetary ball mill for 35 hours. Then, the liquid slurry in the milling jar was discharged. following adding high purity anhydrous alcohol in MOS grade, ball-milling was repeated once. Subsequently, grinding balls and jar mill were washed by high purity anhydrous alcohol in MOS grade for three times. With the above pre-washing treatment, the impurities that could easily drop out from the surface of zirconia grinding balls may be cleaned. In addition, ball-milling for a long period could remove slack structure on the surface of zirconia grinding balls as much as possible and retain the compact and firm grinding ball structure, which would benefit the reduction of the contamination caused by ball-milling impurities.

The ball milled powders had a particle size distribution of d(0.1) of 3.5 μm, d(0.5) of 6.4 μm, and d(0.9) of 10.1 μm.

The ball milled GOS powders were charged in a graphite mould having an inner diameter of 30 mm, and were subjected to spark plasma primary sintering. The sintering temperatures for examples were in the range of 1300-1550° C., respectively (see Table 1 below, with an interval of 50° C. between each examples). The pressure was 60 MPa. The vacuum degree in furnace was 1-15 Pa. The temperature and pressure were kept for 2 hours. At the end of the maintenance of temperature, the cooling procedure was carried out at a cooling rate of 10° C./min. After cooling to room temperature, the sintered body was removed.

When the BN impurities adhered on the surface of the GOS sintered body were removed by rubbing, the sintered body was placed in a muffle furnace and annealed at 1000° C. for 2 hours. After cooling in the furnace, the annealed sintered body was removed. The samples of Examples 1-5 were placed in hot isostatic pressing furnace to conduct secondary sintering. In the secondary sintering, the temperature was slowly increased to 1400° C. and argon was charged until the pressure was 200 MPa. The sintering was carried out for 2 hours while keeping the temperature and the pressure. After slow cooling of sintering furnace, the samples were taken out and subjected to secondary annealing, i.e. at 1000° C. for 2 hours. The density of the sample according to Example 5 was relatively high after the spark plasma primary sintering. Thus, the sample according to Example 5 was not subjected to secondary sintering using hot isostatic pressing. The samples of Examples 1-6 were coarsely grinded, finely grinded and polished, yielding GOS:Pr,Ce,F scintillation ceramics.

Examples 7-10

The scintillation powders were ball-milled and mixed by using the same process as those in Examples 1-6, thereby obtaining powders having the same particle size distribution. The powders were charged in carbon fiber composite mould having an inner diameter of 30 mm and subjected to spark plasma primary sintering. The sintering temperatures for examples were between 1200° C. and 1250° C. (see Table 1 below, with an interval of 50° C. between each examples). The pressure was 200 MPa. The vacuum degree was 1-15 Pa. The temperature and pressure were kept for 2 hours. At the end of the maintenance of temperature, the cooling procedure was carried out at a cooling rate of 10° C./min. After cooling to room temperature, the sintered body was removed, obtaining the GOS primary sintered body. The samples of Examples 7-8 were subjected to the same annealing and secondary sintering using hot isostatic pressing as well as the secondary annealing as those in Examples 1-5, yielding secondary sintered bodies. Examples 9-10 were carried out by applying annealing treatments without the hot isostatic pressing secondary sintering. Samples of examples 7-10 were coarsely grinded, finely grinded and polished, yielding GOS:Pr,Ce,F scintillation ceramics.

Examples 11-12

100 g of commercial $Gd_2O_2S$:Pr,Ce scintillator powder having a purity of 99.999% and a particle size distribution of d(0.1) of 4.0 μm, d(0.5) of 6.8 μm, and d(0.9) of 11.8 μm was weighted. 0.2 g of LiF sintering-aid agent was added. The mixture was placed in planetary ball mill according to the operations in Examples 1-6, and ball-milled and refined at the rate of 500 rpm for 7 hour, with an interval between forward and reverse operations of 0.5 h. The ball-milled mixed powders had a particle size distribution of d(0.1) of 1.1 μm, d(0.5) of 2.1 μm, and d(0.9) of 3.8 μm. The powders were charged in a graphite mould having an inner diameter of 30 mm, and were subjected to spark plasma primary sintering. The sintering temperatures were 1300 and 1400° C., respectively. The pressure was 60 MPa. The vacuum degree was 1-15 Pa. The temperature and pressure were kept for 2 hours. At the end of sintering, the cooling procedure was carried out at a cooling rate of 10° C./min. After cooling to room temperature, the sintered body was removed, yielding GOS primary sintered body. The sample of Example 11 was subjected to annealing and secondary sintering using hot isostatic pressing as well as secondary annealing according to Examples 1-5. The sample of Example 12 was only subjected to annealing treatment, because it had already had high relative density, thus not being subjected to secondary sintering using hot isostatic pressing. Examples 11-12 were coarsely grinded, finely grinded and polished, yielding GOS: Pr,Ce,F scintillation ceramics.

Examples 13-15

The scintillation powders were ball-milled and mixed by using the same process as those in Examples 11-12, thereby obtaining powders having the same particle size distribution. The powders were charged in carbon fiber composite mould having an inner diameter of 30 mm and subjected to spark plasma primary sintering. The sintering temperatures were in the range of 1200-1300° C., respectively. The pressure was 200 MPa. The vacuum degree was 1-15 Pa. The temperature and pressure were kept for 2 hours. At the end of the maintenance of temperature, the cooling procedure was carried out at a cooling rate of 10° C./min. After cooling to room temperature, the sintered body was removed, obtaining the GOS primary sintered body. The sample of Example 13 was subjected to the same annealing and secondary sintering using hot isostatic pressing as well as the secondary annealing as those in Examples 1-5, yielding secondary sintered body. The samples of Examples 14-15 were only subjected to annealing treatment, without secondary sintering using hot isostatic pressing. Examples 13-15 were coarsely grinded, finely grinded and polished, yielding GOS:Pr,Ce,F scintillation ceramics.

Table 1 shows the parameters for sintering and the final performances of the resultant scintillation ceramics of above Examples 1-15.

integral transmittance of 30-35% in the range of 500-520 nm and have good processability.

The GOS scintillation ceramics according to the invention could be used as scintillator element in the detectors for example, solid scintillation detector for detecting ionizing radiation such as X-ray, γ-ray, electron beam and the like. It is particularly suitable for X-ray computerized tomography (X-CT) equipment and/or X-ray luggage scanner in which the scintillator is required to have low afterglow.

Due to the low cost of the process according to the invention, the prepared scintillator is especially suitable for use in X-ray luggage scanner and/or X-ray computerized tomography (X-CT) equipment for security inspection.

The scintillation ceramics according the invention have good performance and are also useful for X-CT detector in the field of medical imaging.

The invention claimed is:

1. A process for preparing gadolinium oxysulfide (GOS) scintillation ceramics, comprising:
   adding to GOS scintillation ceramic powders a sintering-aid agent, and mixing the GOS scintillation ceramic powders and the sintering-aid agent to be homogeneous;
   charging the homogenous mixture of the GOS scintillation ceramic powders with the sintering-aid agent into a sintering mould, and subjecting it to spark plasma primary sintering, thereby obtaining a GOS primary sintered body;
   annealing the GOS primary sintered body;
   subjecting the annealed GOS primary sintered body to secondary sintering using hot isostatic pressing, thereby obtaining a GOS secondary sintered body; and

TABLE 1

| Sample No. | Median diameter of powders/ μm | Temperature for primary sintering/ ° C. | Pressure for primary sintering/ MPa | Relative density for primary sintered body | Secondary sintering using hot isostatic pressing/ ° C.-MPa | The final performance |
|---|---|---|---|---|---|---|
| 1 | 6.4 | 1300 | 60 | 95.2% | 1400-200 | good |
| 2 | 6.4 | 1350 | 60 | 96.6% | 1400-200 | good |
| 3 | 6.4 | 1400 | 60 | 97.9% | 1400-200 | excellent |
| 4 | 6.4 | 1450 | 60 | 99.5% | 1400-200 | excellent |
| 5 | 6.4 | 1500 | 60 | 99.7% | NO | good |
| 6 | 6.4 | 1550 | 60 | 99.7% | 1400-200 | Brittle rupture during processing |
| 7 | 6.4 | 1200 | 200 | 99.7% | 1400-200 | excellent |
| 8 | 6.4 | 1250 | 200 | 99.8% | 1400-200 | excellent |
| 9 | 6.4 | 1200 | 200 | 99.7% | NO | good |
| 10 | 6.4 | 1250 | 200 | 99.8% | NO | good |
| 11 | 2.1 | 1300 | 60 | 99.7% | 1400-200 | excellent |
| 12 | 2.1 | 1400 | 60 | 99.9% | NO | good |
| 13 | 2.1 | 1200 | 200 | 99.6% | 1400-200 | excellent |
| 14 | 2.1 | 1250 | 200 | 99.9% | NO | good |
| 15 | 2.1 | 1300 | 200 | 99.9% | NO | excellent |

As shown in Table 1, due to high temperature in spark plasma primary sintering followed by secondary sintering hot isostatic pressing, the crystal particles of the sample No. 6 excessively grew, resulting in brittle rupture during final processing. The GOS scintillation ceramics prepared under other parameters had good light transmittance in visible light band. The ceramic chips having a thickness of 2 mm have subjecting the GOS secondary sintered body to secondary annealing, to obtain GOS scintillation ceramics,
wherein the spark plasma primary sintering comprises:
   pre-pressurizing to 20-40 MPa, and gradually applying current to at least thousands of amperes, heating to 1000° C.-1100° C. and keeping the temperature for 0.5-1hours; and further heating to 1200° C.-1500° C. meanwhile pressurizing to 60-200 MPa, to carry out the spark plasma sintering, yielding the GOS primary sintered body.

2. The process according to claim 1, wherein the mixing is performed by ball-milling to obtain a primary scintillation ceramic powders incorporated with the sintering-aid agent having a median diameter of 4-9 μm.

3. The process according to claim 2, wherein for the primary powders, the spark plasma sintering is carried out at the temperature from 1350° C. to 1500° C., and at the pressure from 150to 200 MPa.

4. The process according to claim 2, wherein for the primary powders, the spark plasma sintering is carried out at the temperature from 1400° C. to 1450° C.

5. The process according to claim 2, wherein for the primary powders, the spark plasma sintering is carried out at the pressure of 200 MPa.

6. The process according to claim 1, wherein the mixing is performed by ball-milling, and the process further comprises the step of further refining the mixed powders by ball-milling, to obtain a secondary scintillation ceramic powders incorporated with the sintering-aid agent having a median diameter of 1-4 μm.

7. The process according to claim 6, wherein for the secondary powders, the spark plasma sintering is carried out at the temperature from 1200° C. to 1350° C., and at the pressure from 50-150 MPa.

8. The process according to claim 6, wherein for the secondary powders, the spark plasma sintering is carried out at the temperature from 1250° C. to 1300° C.

9. The process according to claim 6, wherein for the secondary powders, the spark plasma sintering is carried out at the pressure of 60 MPa.

10. The process according to claim 6, wherein said refining obtains a secondary scintillation ceramic powders incorporated with the sintering-aid agent having a median diameter of 2-3 μm.

11. The process according to claim 1, wherein the sintering-aid agent is LiF or $Li_2GeF_6$ and is added in an amount of 0.02-1%, based on the mass of the scintillation ceramic powders.

12. The process according to claim 1, wherein the sintering-aid agent is LiF or $Li_2GeF_6$ and is added in an amount of 0.1-1%, based on the mass of the scintillation ceramic powders.

13. The process according to claim 1, wherein the spark plasma primary sintering comprises pre-pressurizing to 25-35 MPa.

14. The process according to claim 1, wherein the spark plasma primary sintering comprises pre-pressurizing to 30 MPa.

15. The process according to claim 1, wherein the primary annealing comprises the step of annealing the GOS primary sintered body at the temperature ranging from 1000° C. to 1200° C.

16. The process according to claim 1, wherein the secondary sintering using hot isostatic pressing comprises the step of subjecting the annealed GOS primary sintered body to secondary sintering using hot isostatic pressing under the atmosphere of inert gas at a temperature of from 1300° C. to 1500° C. under 150-250 MPa.

17. The process according to claim 1, wherein the secondary annealing comprises the step of subjecting the secondary sintered body to secondary annealing at the temperature ranging from 1000° C. to 1200° C.

18. The process according to claim 1, wherein the mould for sintering is a mould made of isostatic pressing graphite material or a mould made of carbon fiber composite.

19. The process according to claim 1, wherein the mould is lined with BN ceramic cylinder, and wherein along the direction of pressure axis, and a BN ceramic chip is firstly placed on a side of contacting scintillation powders, and then a graphite paper is laminated.

20. The process according to claim 1, wherein the scintillation ceramic powders are $Gd_2O_2S$:Pr,Ce scintillation ceramic powders having a median diameter of 5-9 μm and a purity of 99.999%.

21. The process according to claim 1, wherein in case that the GOS primary sintered body has a density of lower than 99.8%, it is subjected to secondary sintering using hot isostatic pressing.

22. GOS scintillation ceramics obtained by process according to claim 1, which has an integral transmittance of 30% or more at a wavelength of 511 nm, when it is present in a chip having a thickness of 2 mm.

23. A high-energy radiation detecting device, comprising GOS scintillation ceramics obtained by the process according to claim 1.

24. The process according to claim 1, wherein the sintering-aid agent includes LiF or $Li_2GeF_6$.

* * * * *